(12) United States Patent
Kim et al.

(10) Patent No.: US 9,811,052 B2
(45) Date of Patent: Nov. 7, 2017

(54) HOLOGRAM GENERATION APPARATUS AND METHOD

(71) Applicant: KOREA UNIVERSITY RESEARCH AND BUSINESS FOUNDATION, Seoul (KR)

(72) Inventors: Hwi Kim, Sejong (KR); Dajeong Im, Sejong (KR)

(73) Assignee: Korea University Research and Business Foundation, Sejong Campus, Sejong-si (KR)

( * ) Notice: Subject to any disclaimer, the term of this patent is extended or adjusted under 35 U.S.C. 154(b) by 153 days.

(21) Appl. No.: 14/794,484

(22) Filed: Jul. 8, 2015

(65) Prior Publication Data

US 2016/0033934 A1    Feb. 4, 2016

(30) Foreign Application Priority Data

Jul. 31, 2014 (KR) ........................ 10-2014-0098228

(51) Int. Cl.
*G03H 1/08* (2006.01)
*G03H 1/22* (2006.01)

(52) U.S. Cl.
CPC ......... *G03H 1/0808* (2013.01); *G03H 1/2294* (2013.01); *G03H 2210/441* (2013.01); *G03H 2210/45* (2013.01)

(58) Field of Classification Search
CPC ...... G03H 1/08; G03H 1/0841; G03H 1/0866; G03H 1/0808; G03H 1/0891; G03H 1/16; G03H 1/20; G03H 2210/40–2210/452; G03H 1/2294; G03H 2001/207

USPC ....................................... 359/9, 29
See application file for complete search history.

(56) References Cited

U.S. PATENT DOCUMENTS

2006/0139710 A1*  6/2006  Schwerdtner ........ G03H 1/0808
                                                              359/9
2014/0355861 A1*  12/2014  Nirenberg .............. H04N 19/85
                                                              382/133

OTHER PUBLICATIONS

Im D. et al (Phase regularized polygon computer gebnerated holograms, Optics Letters, vol. 39, No. 12, Jun. 15, 2014, pp. 3642-3644).*

* cited by examiner

*Primary Examiner* — Jade R Chwasz
*Assistant Examiner* — Jyotsna Dabbi
(74) *Attorney, Agent, or Firm* — Sughrue Mion, PLLC

(57) ABSTRACT

A hologram generation apparatus is based on a hologram imaging system which includes an object space where an object is situated and a retina space or region where an image is formed within an eyeball of an observer. The hologram generation apparatus includes a modeling unit for generating first graphic data by transforming a 3D image of a 3D object to a set of polygonal facets; a data transformation unit for generating second graphic data by transforming the first graphic data from the modeling unit to normal/reference coordinates in the retina region; a hologram generation unit for generating a first computer generated hologram (CGH1), which is light wave analysis data for the second graphic data; and a hologram transformation unit for transforming the first computer generated hologram (CGH1) in the retina region to a second computer generated hologram (CGH2) in the object space.

7 Claims, 4 Drawing Sheets

HOLOGRAM GENERATION APPARATUS AND METHOD

CROSS-REFERENCE TO RELATED APPLICATIONS

This application claims priority under 35 U.S.C. §119(a) to Korean Patent Application No. 10-2014-0098228 filed on Jul. 31, 2014, the disclosure of which is incorporated by reference in its entirety herein.

BACKGROUND

1. Field

The present invention generally relates to a hologram generation apparatus and method and particularly, to a phase-regularized polygon hologram generation apparatus and method for holographic 3D display.

2. Description of Related Art

At present, research is being actively made for three-dimensional (3D) imaging and image generating techniques. 3D imaging and related media is realistic imaging media of a new concept, which brings the standard of visual information to a higher dimension, and the imaging media is expected to lead next-generation imaging devices. While currently existing 2D imaging systems provide planar imaging, 3D imaging systems utilize and may thus offer the ultimate image-generating technique in that 3D imaging systems provide actual/true imaging information to user-observers.

Currently being researched and developed are 3D imaging techniques, including stereoscopy, holography, and integral imaging. Of these, holography technique enables a 3D image to be made, without eyeglasses for viewing, by reconstructing a hologram formed by using a laser.

Holography technique uses a principle of recording and reconstructing interference signals obtained when light reflected from an object (object beam) and light with coherency (reference beam) intersect with each other. Using a laser beam with high coherency, a hologram is made by recording on a photographic film, interference patterns created by intersecting and interfering of the object beam, which is directed at the object and scattered off from the object, and a reference beam, which is directed from another direction. When the object beam and the reference beam intersect, interference patterns are formed, and the interference patterns are recorded with amplitude and phase information. The interference patterns include intensity and phase information of light waves. Intensity information is recorded as contrast between patterns in the interference patterns, and amplitude information is recorded as a distance between patterns in the interference patterns. Directing a reference light at thus recorded interference patterns and reconstructing the interference patterns recorded in the hologram as a 3D image is called holography.

A computer-generated hologram (CGH), which uses a computer for storing, transmitting, and imaging of hologram patterns, has also been developed. CGHs have been developed in various ways, and recently, with advances in the digital industry, systems have been developed to take CGHs beyond a still-image stage to a video/display realm.

By using a computer, a CGH system may compute an interference pattern and generate an hologram interference pattern image. A CGH system transmits data for the hologram interference pattern image to a spatial light modulator (SLM). When a reference light is directed at the SLM, the hologram interference pattern displayed on the SLM is reconstructed as a 3D image.

FIG. 1 shows components of a digital hologram generation apparatus implementing computer-generated hologram (CGH) method according to a conventional technology. Referring to FIG. 1, a computer (10) generates hologram interference pattern data applicable to a 3D image to be obtained. The hologram interference pattern generated is transmitted to a spatial light modulator (SLM) (20). The SLM (20) may be built as a backlit liquid crystal display (LCD) panel and display the hologram interference pattern thereon. At one side of the SLM (20), there is a laser light source (30) to be used to emit a reference light. To evenly distribute the reference light (90) emitted from the laser light source (30) on front side of the SLM (20), an expander (40) and a lens (50) may be positioned in a sequential order. The reference light (90) from the laser light source (30) passes through the expander (40) and the lens (50) and is directed to a side of the SLM (20). Where the SLM (20) is a backlit LCD panel, a 3D image (80), which is formed by the hologram interference pattern displayed on the SLM (20), is displayed on another side of the SLM (20). A field lens is denoted by FL.

For displaying a holographic image, a CGH is formed, and hologram interference pattern data is created using the CGH, based on point cloud or polygon modeling technique. Point cloud CGH technique may be used for representing a 3D object as a set of data points, and polygon CGH technique may be used for representing a 3D object as a set of polygonal facets. As the point cloud CGH technique requires a large amount of data for detailed representation, the polygon CGH technique is used more often for 3D object modeling.

However, when the polygon CGH is used, there exist dark line defects, which are observed in the holographic 3D image at or between triangles.

FIG. 2 shows a cause of the dark line defects in a polygon computer generated hologram (polygon CGH).

As shown in FIG. 2, an abrupt change is observed in the wavefront created between the triangles when a plane wave is incident on a triangular aperture. As a result, diffraction of the incident plane wave occurs, and some high order components move beyond the eye lens region of an observer and energy decreases. When actually observed by the observer, these are recognized as dark-line defects.

FIG. 3 shows a holographic 3D image with actual dark-line defects.

Conventional polygon CGH continues to have the dark-line defects, and holographic images obtained from the conventional polygon CGH still lacks clarity thereby posing a problem.

SUMMARY

The present invention has been devised to solve problems such as the one above and, among others, is aimed at providing a hologram generation apparatus and method for eliminating dark-line defects in a hologram image implemented and generated as a polygon computer generated hologram (polygon CGH).

A hologram generation apparatus according to an embodiment of the present invention is a hologram generation apparatus based on a hologram imaging system, which includes an object space, where an object is situated, and a retina space or region, where an image is formed within an eyeball of an observer. The hologram generation apparatus comprises: a modeling unit for generating first graphic data by transforming a 3D image of a 3D object to a set of polygonal facets; a data transformation unit for generating second graphic data by transforming the first graphic data from the modeling unit to normal/reference coordinates in the retina region; a hologram generation unit for generating a first computer generated hologram (CGH1), which is light wave analysis data for the second graphic data; and a hologram transformation unit for transforming the first computer generated hologram (CGH1) in the retina region to a second computer generated hologram (CGH2) in the object space.

A hologram generation method according to an embodiment of the present invention is a hologram generation method based on a hologram imaging system, which includes an object space, where an object is situated, and a retina space or region, where an image is formed within an eyeball of an observer. The hologram generation method comprises: a step for generating first graphic data by modeling, which transforms in the object space, an object to a set of polygonal facets; a step for transforming the first graphic data to second graphic data generated in the retina region; a step for generating a first computer generated hologram (CGH1), which is light wave analysis data for the second graphic data; and a step for transforming the first computer generated hologram (CGH1) to a second computer hologram (CGH2), which is light wave analysis data in the object space.

According to a hologram generation apparatus and method according to embodiments of the present invention, dark-line defects are not present in a hologram image generated as a polygon computer generated hologram (polygon CGH).

DETAILED DESCRIPTION

Disclosed hereafter are embodiments of the present invention. As various changes may be applied to the embodiments, the embodiments may take on other forms. As such, only exemplary embodiments are shown in the accompanying drawings and described herein with reference thereto.

The exemplary embodiments described are not intended to limit the present invention and thus should not be construed to limit the present invention as to the particular forms, structures, or functions described. All modifications, equivalents, and substitutions within the spirit and technical scope of the present invention are included therein.

Terms such as "first" and "second" may be used to describe various parts or elements and should also not be limited to one particular part or element. Such terms are used to distinguish one element from another element. For example, a first element may be designated as a second element, and vice versa, without departing from the technical scope of the present invention.

Unless otherwise stated, when one element is described, for example, as being "connected" or "coupled" to another element, the elements may be construed as being directly or indirectly linked (i.e., there may be an intermediate element between the elements). Similar concept applies to such terms as "between" and "adjacent to."

Terms used herein are used to describe the exemplary embodiments and are not intended to limit the present invention. Unless otherwise stated, a singular term may denote and include a plurality. Terms such as "including" and "having" also do not limit the present invention to the features, numbers, steps, operation(s), and parts or elements described; others may exist, (be) added or modified.

Also, unless otherwise clearly stated, all of the terms used herein, including scientific or technical terms, should be defined or interpreted as defined in a plain dictionary in accordance with their usage in the art and/or as ordinarily understood by a person skilled in the art.

Hereinafter, exemplary embodiments of the present invention are described in detail with reference to the accompanying drawings.

Figure 4:
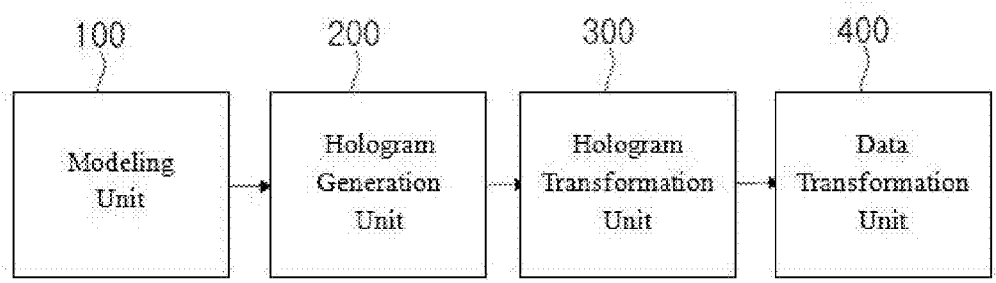
FIG. 4 shows a block diagram of a hologram generation apparatus according to an embodiment.

FIG. 4 shows a block diagram of a hologram generation apparatus according to an embodiment.

Figure 5:
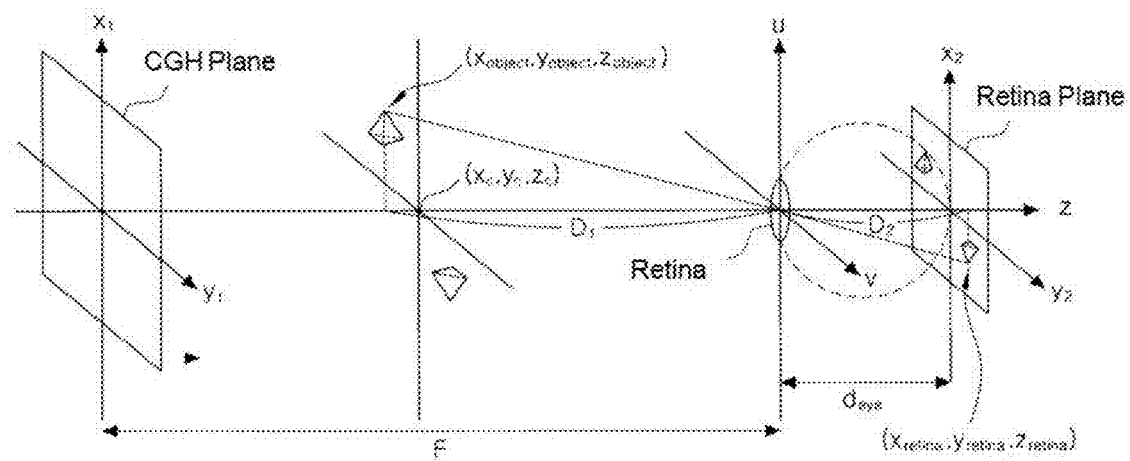
FIG. 5 shows a diagram depicting a hologram imaging and reconstructing system according to an embodiment.

FIG. 5 shows a diagram depicting a hologram imaging and reconstructing system according to an embodiment.

As shown in FIG. 4, a hologram generation apparatus according to an embodiment of the present invention is based on a hologram imaging system, which includes an object space, where an object is situated, and a retina space or region, where an image is formed within an eyeball of an observer. The hologram generation apparatus according to the embodiment comprises: a modeling unit 100 for generating first graphic data by transforming a 3D image of a 3D object to a set of polygonal fragments or facets; a data transformation unit 200 for generating second graphic data by transforming the first graphic data from the modeling unit 100 to normal/reference coordinates in the retina region; a hologram generation unit 300 for generating a first computer generated hologram (CGH1), which is light wave analysis data for the second graphic data; and a hologram transformation unit 400 for transforming the first computer generated hologram (CGH1) in the retina region to a second computer generated hologram (CGH2) in the object space.

Each part or element of the hologram generation apparatus shown in FIG. 4 may be functionally and logically separable; however, a person skilled in the art should readily understand that each part or element is not necessarily a separate physical apparatus nor made by a separate code/coding.

Also, the term "unit" as used herein may denote a functional, structural combination of hardware for carrying out the technical concept of the present invention and software for implementing/performing the hardware. As an example, the term "unit" may denote an applicable/logical standard or measure of a given code and hardware resource for executing the given code.

A hologram generation apparatus according to an embodiment of the present invention includes a computer generated hologram (CGH) plane as shown in FIG. 5 and may be implemented as a system having an object space, where a 3D image of an object is placed, and a retina region depicting/ denoting a human eye. The retina region is configured with a virtual retina plane for a plane in which an image is formed within an eye ball.

The modeling unit 100 generates a first graphic data by transforming a 3D image of a 3D object as a set of polygonal fragments or facets. The set of polygonal facets may be a set of triangle or triangular facets. The 3D image of the object may be acquired in various ways, including by such device as a depth or multi-view camera. The modeling unit 100 performs modeling for the 3D image as a set of triangular facets, i.e., polygon computer generated hologram (polygon CGH).

A holographic 3D image light wave is determined directly by structures on a surface of a 3D object to be depicted by the light wave; that is, a mathematical formulation and arrangement for the 3D image light wave is determined by the structures of surface texture of the 3D object. For a 3D textured object made of triangular segments, setting(s) of the triangular segments, which are viewable by an observer at/from a given/particular direction, change. Such characteristic is a motion parallax element, which should necessarily be implemented in a 3D display. Also, there may be triangular segments, which are situated at a position viewable from two directions, and even for these triangular segments, shapes and relative positions of the segments change as a viewing position changes. Such characteristic is an effect, wherein a triangular segment, which is viewable both from two directions, may be viewable depending on a direction but in a continuously different manner depending on a position, and this effect is a most important physical element of a holographic 3D image light wave.

The data transformation unit 200 generates second graphic data by transforming the first graphic data from the modeling unit 100 as normal/reference coordinates in the retina region. Referring to FIG. 5 to describe the transformation to the second graphic data, a corner point of an object is considered and denoted as $(x_{object}, y_{object}, z_{object})$, with a center point of the CGH plane shown in FIG. 5 as an origin. Coordinates for center of mass of an upper side triangle facet and a lower side triangle facet as shown in FIG. 5 are $(x_c, y_c, z_c)$. Where coordinates of an image formed in the retina after passing through an eye lens are denoted as $(x_{retina}, y_{retina}, z_{retina})$, the image coordinates are expressed as Formula (1) below, according to lens formula and triangle facet distance ratio:

$$(x_{retina}, y_{retina}, z_{retina}) = (-x_{object} D_2/D_1, -y_{object} D_2/D_1, D_2 - d_{eye}) \quad (1)$$

where $D_1 = F - z_{object}$; $D_2 = 1/[(1/f_{eye}) - (1/D_1)]$;
$f_{eye} = 1/[(1/(F - z_c)) + (1/d_{eye})]$, and
$d_{eye}$ is a distance between the eye lens and the retina plane.

As described, each point $(x_{object}, y_{object}, z_{object})$ of an object referenced with respect to the CGH plane is transformed to each point $(x_{retina}, y_{retina}, z_{retina})$ image that passed through the eye lens. At this time, it may be verified through Formula (1) that that among the points on the object as presented in the retina plane, $(x_{retina}, y_{retina})$ coordinate point decreases at an equivalent rate according to a scale of $D_1$ and $D_2$. $(z_{retina})$ coordinate point is a position in z-direction, away from the origin in the retina plane.

By expressing as above, four points on each of the triangle facets shown in FIG. 5 as each coordinate on the object in the retina plane, the data transformation unit 200 generates the second graphic data by transforming the first graphic data generated in the modeling unit 100 with respect to the retina region (i.e., the retina plane).

The hologram generation unit 300 generates a first computer generated hologram (CGH1), which is light wave analysis data for the second graphic data transformed as normal/reference coordinates in the retina region. CGH1 computes light wave distribution of a transformed 3D object in an inner region of the eye ball and as a first step, records it in the retina plane.

The hologram transformation unit 400 transforms the first computer generated hologram (CGH1) in the retina region to a second computer generated hologram (CGH2) in the object space. The hologram transformation unit 400 transforms CGH1 as CGH2 through an inverse Fresnel Transform (IFrT).

CGH1 or light wave distribution in the retina region is considered and denoted as $F(x_2, y_2)$, and CGH2 or light wave distribution in the object space, as $G(x_1, y_1)$.

Also, denoting light wave distribution in an eye lens plane (e.g., as shown in FIG. 5) as $W(u, v; \lambda)$, $F(x_2, y_2)$ and $G(x_1, y_1)$ attains relationships in Formulae (2) and (3) below through a cascaded Fresnel Transform:

$$W(u, v; \lambda) = FrT_1(G(x_1, y_1)) \quad (2)$$

$$F(x_2, y_2; \lambda) = FrT_2(t(u, v; \lambda) W(u, v)) \quad (3)$$

Here, $W(u, v; \lambda)$ is as in Formula (4) below:

$$W(u, v; \lambda) = \frac{e^{jkF}}{j\lambda F} \int\int_{-\infty}^{\infty} G(x_1, y_1) e^{-j\frac{2\pi}{\lambda F}(x_1 u + y_1 v)} dx_1 dy_1 \quad (4)$$

And, $F(x_2, y_2; \lambda)$ observed by a finite pupil is as in Formula (5) below:

$$F(x_2, y_2; \lambda) = \frac{e^{j\frac{\pi}{\lambda d_{eye}}(x_3^2 + y_2^2)}}{(j\lambda F)(j\lambda d_{eye})} \int\int t(u, v) W(u, v) e^{-j\frac{2\pi}{\lambda d_{eye}}(ux_2 + vy_3)} du dv \quad (5)$$

Using Formulae (4) and (5) and Fresnel Transform to acquire CGH2 or the light wave distribution in the object space through $G(x_1, y_1)$, $G(x_1, y_1)$ is as in Formula (6) below:

$$G(x_1, y_1) = IFrT_1(t^{-1}(u, v; \lambda) IFrT_2(F(x_2, y_2; \lambda))) \quad (6)$$

where $$t^{-1}(u, v; \lambda) = e^{-j\frac{\pi}{\lambda}\left(\frac{1}{F} + \frac{1}{d_{eye}} - \frac{1}{f_{eye}}\right)(u^3 + v^3)}.$$

Through the above Formulae, the hologram transformation unit 400 transforms the first computer generated hologram (CGH1) to a second computer generated hologram (CGH2).

Figure 6:
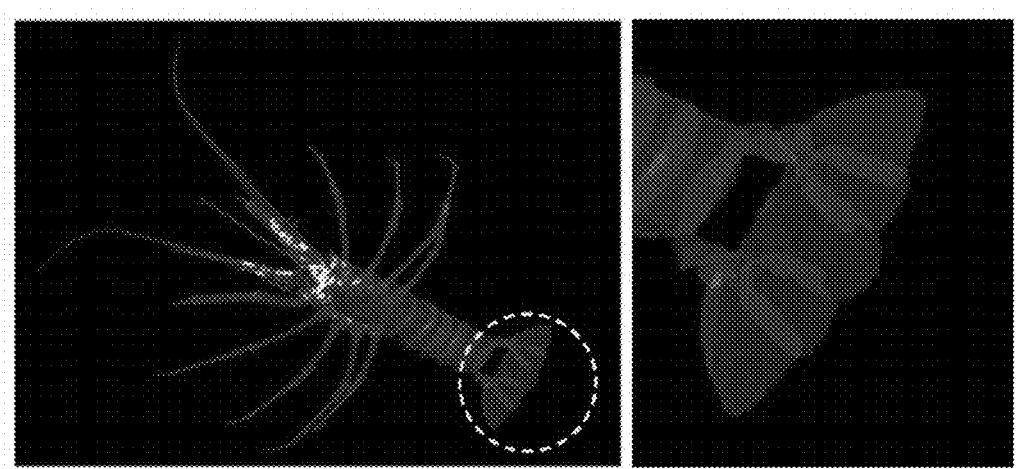
FIG. 6 shows an image generated by a hologram generation apparatus according to an embodiment.

FIG. 6 shows an image generated by a hologram generation apparatus according to an embodiment.

Figure 1:
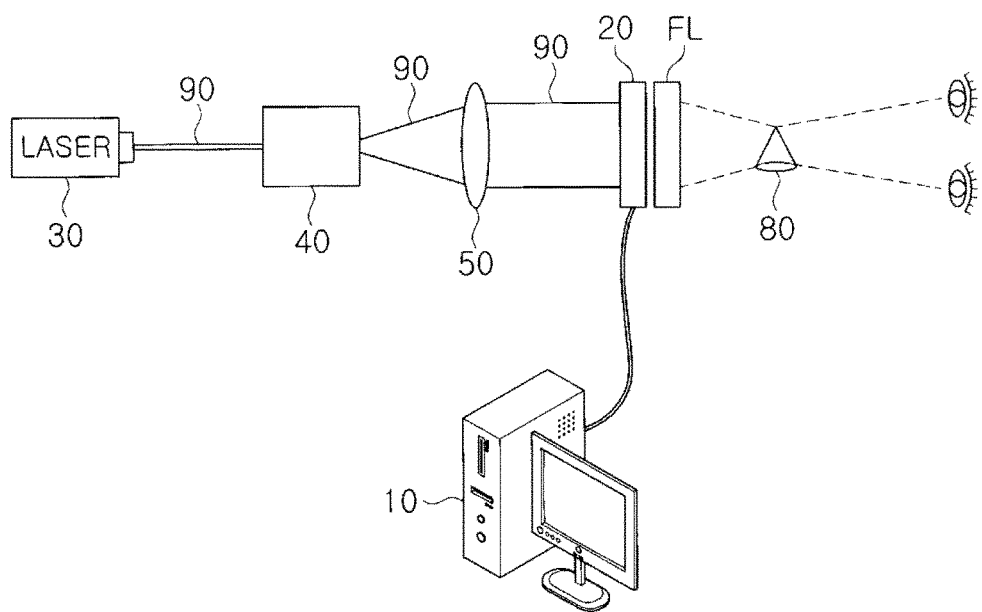
FIG. 1 shows components of a digital hologram generation apparatus implementing computer-generated hologram (CGH) method according to a conventional technology.
Figure 2:
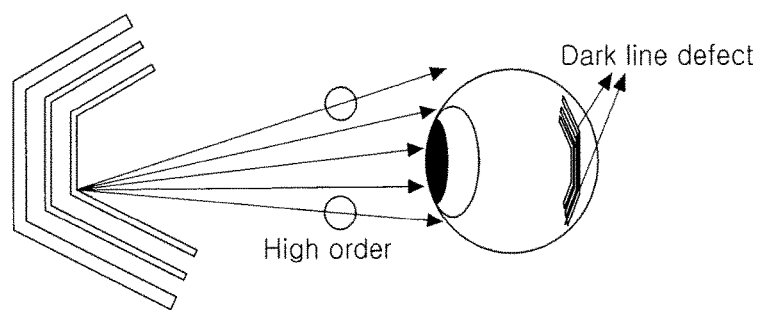
FIG. 2 shows a cause of the dark line defects in a polygon computer generated hologram (polygon CGH).
Figure 3:
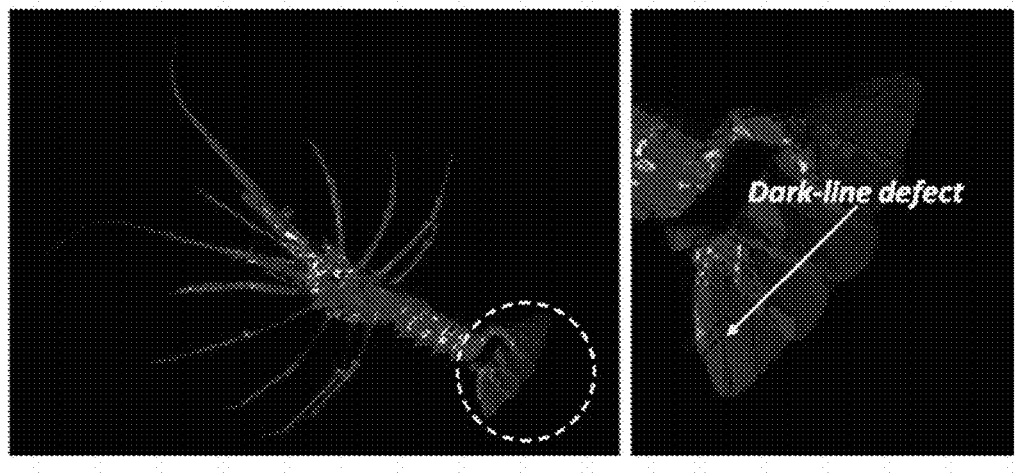
FIG. 3 shows a holographic 3D image with actual dark-line defects.

Comparing the image shown in FIG. 6 with the image with actual dark-line defects shown in FIG. 3, it may be verified that dark-line defects are not present in the image generated by using a hologram generation apparatus according to an embodiment of the present invention. Particularly, the dark-line defect clearly formed and pointed out in the tail portion of the object in the image shown in FIG. 3 is not present in the image shown in FIG. 6.

Such hologram generation apparatus may be configured to be included a digital hologram image display system so that the display system generates a holographic image without dark-line defects.

Heretofore, a hologram generation apparatus according to an embodiment of the present invention has been described.

A hologram generation method according to another aspect of the present invention is described with reference to FIG. 7. Descriptions for elements in the above embodiments are omitted.

Figure 7:
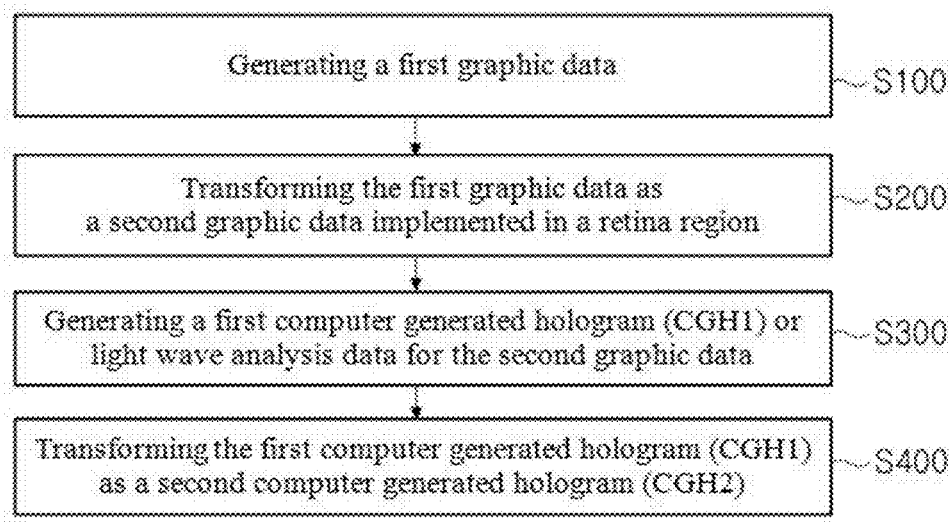
FIG. 7 shows a flowchart for a hologram generation method according to an embodiment.

FIG. 7 shows a flowchart for a hologram generation method according to an embodiment.

A hologram generation method according to an embodiment is a hologram generation method based on a hologram imaging system, which includes an object space, where an object is situated, and a retina space or region, where an image is formed within an eyeball of an observer. The hologram generation method comprises: a step (S100) for generating first graphic data by modeling, which transforms an object in the object space to a set of polygonal facets; a step (S200) for transforming the first graphic data to second graphic data implemented and generated in the retina region; a step (S300) for generating a first computer generated hologram (CGH1), which is light wave analysis data for the second graphic data; and a step (S400) for transforming the first computer generated hologram (CGH1) to a second computer hologram (CGH2), which is light wave analysis data for the object space.

As shown in FIG. 7, the step (S100) for generating the first graphic data performs modeling of an outline or shape of a 3D object as a set of polygonal facets. Particularly, modeling as triangular facets may be preferred.

After generating the first graphic data, the step (S200) for transforming the first graphic data to the second graphic data is performed. The step (S200) transforms a plurality of corner points in the first graphic data (of the CGH plane), which is normal/reference coordinates in the object space, to the second graphic data of the retina plane, which is normal/reference coordinates in the retina space or region.

The step (S300) for generating the first computer generated hologram (CGH1), which is light wave analysis data for the second graphic data in the retina region, is then performed. The step (S300) for generating the first computer generated hologram (CGH1), as light wave analysis data for the second graphic data distorted in the retina plane, again transforms the first computer generated hologram (CGH1) to the second computer generated hologram (CGH2), which is a computer generated hologram in the object space, i.e., the step (S400).

The second computer generated hologram (CGH2) thus generated through the steps is used to create a hologram interference pattern image, and reconstructing the interference pattern image as a holographic image through a spatial light modulator (SLM), an image without dark-line defects may be generated.

The invention claimed is:

1. A hologram generation apparatus based on a hologram imaging system, which includes an object space where an object is situated and a retina space where an image is formed within an eye, the hologram generation apparatus comprising:
a processor; and
a memory configured to store instructions executable by the processor,
wherein the processor is configured to:
generate first graphic data by transforming a 3D image of a 3D object to a set of polygonal facets,
generate second graphic data by transforming the first graphic data to reference coordinates in the retina space,
generate a first computer generated hologram which is light wave analysis data for the second graphic data, and
transform the first computer generated hologram in the retina space to a second computer generated hologram in the object space.

2. The hologram generation apparatus according to claim 1, wherein the first computer generated hologram is computed in the retina space and recorded in a retina plane where the 3D image is formed.

3. The hologram generation apparatus according to claim 1, wherein the processor is further configured to transform the first computer generated hologram to the second generated hologram through an inverse Fresnel Transform.

4. A digital hologram image display system comprising the hologram generation apparatus of claim 1.

5. A hologram generation method based on a hologram imaging system, which includes an object space where an object is situated and a retina space where an image is formed within an eye, the hologram generation method comprising:
generating first graphic data by modeling, whereby the object is transformed to a set of polygonal facets in the object space;
transforming the first graphic data to second graphic data generated in the retina space;
generating a first computer generated hologram which is light wave analysis data for the second graphic data; and
transforming the first computer generated hologram to a second computer generated hologram which is light wave analysis data for the object space.

6. The hologram generation method according to claim 5, wherein the transforming the first graphic data comprises transforming reference coordinates in the object space to reference coordinates in the retina space.

7. The hologram generation method according to claim 5 further comprising
generating a hologram interference-pattern image using the second computer generated hologram after the transforming the first computer generated hologram to the second computer generated hologram.

* * * * *